United States Patent [19]

Gilbu

[11] B 4,009,736

[45] Mar. 1, 1977

[54] SANDWICH WALL GLASS FIBER REINFORCED CONSTRUCTION AND METHOD OF MAKING SAME

[75] Inventor: Agnar Gilbu, Conroe, Tex.

[73] Assignee: Owens-Corning Fiberglas Corporation, Toledo, Ohio

[22] Filed: Dec. 6, 1974

[21] Appl. No.: 530,263

[44] Published under the second Trial Voluntary Protest Program on March 30, 1976 as document No. B 530,263.

[52] U.S. Cl. .............................. 138/177; 138/121; 428/36; 428/222; 428/324; 428/325; 156/190

[51] Int. Cl.² ........................................ F16L 9/00

[58] Field of Search ............ 428/36, 119, 188, 222, 428/273, 302, 323, 324, 325, 331; 138/113, 121, 122, 129, 144, 140, 141, DIG. 2, 177; 156/190, 191, 192, 195

[56] References Cited

UNITED STATES PATENTS

| | | | |
|---|---|---|---|
| 2,644,487 | 7/1953 | Schindler et al. | 138/121 |
| 2,814,313 | 11/1957 | Tate | 138/141 |
| 2,913,011 | 11/1959 | Noyes et al. | 138/122 |
| 3,028,289 | 4/1962 | Roberts et al. | 138/121 |
| 3,028,291 | 4/1962 | Roberts et al. | 138/121 |
| 3,237,477 | 3/1966 | Matz | 138/140 |
| 3,566,607 | 3/1971 | Sixt | 138/121 |
| 3,598,275 | 8/1971 | Francois | 428/113 |
| 3,811,478 | 5/1974 | Ahlqvist | 156/195 |
| 3,821,050 | 6/1974 | Ambrose et al. | 156/192 |

*Primary Examiner*—George F. Lesmes
*Assistant Examiner*—William R. Dixon, Jr.
*Attorney, Agent, or Firm*—John W. Overman; Hiram P. Settle, Jr.; Paul J. Rose

[57] ABSTRACT

A sandwich wall for pipes, tanks, and the like fluid confining uses, wherein concentric inner and outer glass fiber reinforced plastic skins or shells are separated from one another by essentially radial ribs integrated into the shells to form a monolithic construction. The ribs are of limited axial extent and are separated from one another by rib forms of substantially greater axial extent, the rib forms functioning essentially as spacers without otherwise materially contributing to the strength or rigidity of the structure. The ribs are composed of essentially the same resinous material as the shells plus a filler, which typically can be chopped glass fiber strands, sand, or other particulate material, glass fiber mat or woven fabric, glass flakes, or mixtures of such materials. The ribs may be either helical and continuous throughout the axial extent of the wall or annular and independent of one another. Various methods of making such sandwich wall structures are also disclosed.

12 Claims, 7 Drawing Figures

SANDWICH WALL GLASS FIBER REINFORCED CONSTRUCTION AND METHOD OF MAKING SAME

BACKGROUND OF THE INVENTION

This invention is concerned with pipes, tanks and the like fluid confining of the structures intended primarily for underground installation. When so installed, a fluid confining wall must have a degree of stiffness required to prevent buckling under the influence of soil loads and soil compaction. The load carrying capability of such structures must, for economic reasons, be realized with low cost structures utilizing minimum material costs, minimum fabrication cost, and minimum labor cost.

In the past, such structures have been designed in several different ways. But essentially, in use flexing loads are imposed upon the inner and outer surfaces of a pipe, and to increase the resistance to deflection, these surfaces must be separated. This is the principal of an I-beam, an H-beam, honeycomb panels, and the like. In conventional pipes, the wall thickness of the pipe is simply increased to achieve the requisite minimum stiffness. In glass fiber reinforced plastic pipe, it has been proposed that the wall thickness be increased by providing a composite wall wherein heavily glass fiber reinforced inner and outer surface layers of a pipe are separated by a medial layer of a filler, such as sand or the like. Such a structure is proposed in Carlstrom U.S. Pat. No. 3,406,724 and in Grosh U.S. Pat. No. 3,483,896. Another alternative proposal is the separation of inner and outer skins or shells by a foam coating applied to the inner skin, as in U.S. Pat. Nos. 3,295,558 and 3,598,275. Other proposals have included the use of cores or paper honeycomb cores. In all of these constructions, the problem has been the shearing of the core along the central or neutral axis of the pipe wall upon deflection loading of the pipe in its underground environment.

Another proposal has been the provision of a ribbed pipe or tank wall to achieve the required minimum stiffness. Here, the rib can fail due to excessive stresses at the rib crown. Thus, increasing the height of the rib to increase the stiffness causes stress failures at the rib crown. Further, the material required to achieve minimum stiffness and yet prevent failure due to excessive stress is substantial, and the cost efficiency of ribbed walls is doubtful.

It has also been proposed that inner and outer shells be interconnected by internal ribs inserted into a low strength core material. For example, Anderson U.S. Pat. No. 3,335,904 proposes trapezoidal ribs interposed in a foam or other low strength core material. Another proposal is the covering of an inner skin with a uniform layer of foam, grinding or cutting a slot into the foam material and then filling the slot with filament linings. These constructions have not been successful because of the high cost in producing them, and the difficulty of obtaining essentially radially extending integral ribs which are effective to form an integral monolithic structure with the shells. Such structures have not become commercial.

BRIEF DESCRIPTION OF THE PRESENT INVENTION

The present invention now proposes a fluid confining cylindrical wall intended primarily for underground use which is of "sandwich" construction and wherein inner and outer glass fiber reinforced plastic shells are separated from one another by essentially radial ribs which are integrated with the shells to form a monolithic structure. The ribs are essentially radial so that compression forces are transferred directly from one shell to another as the wall structure is subjected to deflection forces. The ribs are subjected to shear and compressive forces primarily, and the ribs are made of materials or combinations of materials adapted to adequately resist such forces. The radial extent of the ribs is determined by the degree of separation of the two shells. Further, the radial extent of the ribs is inversely proportional to the radial thickness of the two individual shells and is also inversely proportional to the flexural modules required in the final wall structure.

The ribs are axially separated from one another along the axial extent of the wall and the ribs are of limited axial extent, preferably on the order of one-eighth inch to one-half inch each, the ribs being separated from one another by rib forms of much greater axial extent, on the order of 10 to 50 times the rib dimension. The rib forms interposed between the adjacent ribs function essentially as spacers and do not materially contribute to the strength or rigidity of the structure.

Depending upon the method of construction, the ribs can be either helical and continuous, as where the wall is built up on a continuously traveling, helical band mandrel such as that disclosed in Poulsen U.S. Pat. No. 3,464,879, or the ribs can be annular and independent of one another, as where the wall structure is built up upon a rotating cylindrical mandrel.

In either event, the ribs are built up between rib forms from essentially the same resinous material as the inner and outer skins or shells of the structure plus a filler. This filler can be chopped glass fiber strands, sand or other particulate material, glass fiber mat or woven fabric, glass flakes, or mixtures of such materials. In the finally completed structure, the resin of the ribs and the resin of the shells is finally commonly cured to provide a monolithic structure in which the glass fiber reinforcement in the shells and the filler in the ribs are integrated into the final structure by the commonly cured resin content of the complete wall.

The methods of the present invention involve the initial building up of an inner shell on a mandrel, the application of a pre-fabricated rib form or forms onto this inner shell, the deposition of resin-filler material between adjacent rib forms to form the ribs, and the final application of an outer shell over the inner shell and rib construction which was previously built up on the mandrel. Finally, the inner shell, ribs and outer shell are jointly cured while still supported on the mandrel.

The present invention proposes certain production methods for the continuous manufacture of the sandwich wall of the present invention upon a mandrel wherein the mandrel surface is provided by a spirally wound band which travels helically over guide means to define the mandrel surface, such machines being disclosed in Poulsen U.S. Pat. No. 3,464,879.

One proposed method of rib production involves bridging the space between adjacent rib forms with a glass fiber mat which is then drawn down into the space between adjacent rib forms by filament winding under tension. Thus, the mat is deflected into a U shape, with the bight of the U shape contacting the inner shell and the extremities of the legs of the U shape contacting the outer shell. Similarly the space between the adjacent rib forms can be bridged by elongated chopped glass fibers which are drawn down into the space between the rib forms in the same manner by filament winding under tension to again provide a rib structure.

Alternatively, the spaces between the adjacent rib forms can be filled with a paste of resin plus sand or other particulate filler to provide solid ribs joining the inner and outer shells. Chopped glass, glass flakes or the like reinforcing agents can be added to the resin-sand paste if desired or necessary.

It is, therefore, an important object of the present invention to provide a composite wall structure having concentric tubular inner and outer shells of glass fiber reinforced synthetic resin material, the shells having interposed therebetween and commonly cured therewith essentially radially extending integral ribs comprising essentially the same synthetic resin material as the shells and a filler material.

Another important object of the present invention is the provision of a composite wall structure wherein inner and outer glass fiber reinforced tubular shells are joined by an intermediate spacing structure integral with the shells and including axially spaced rib forms and essentially radially extending integral ribs formed in situ between the rib forms and including essentially the same synthetic resin material as the shells plus a filler material.

It is a further important object of this invention to provide a method of making a composite wall structure on a rotatable mandrel by building up a first layer of glass fiber reinforced synthetic resin material, superimposing axially spaced rib forms on the previously made layer, forming in situ axially spaced radial ribs intermediate the spaced rib forms, superimposing an outer layer of glass fiber reinforced synthetic resin material over the rib forms and the ribs, and commonly curing the two layers and the ribs therebetween to form a monolithic structure.

Yet another, and no less important, object of the present invention is to provide a method of making a composite structural wall of tubular configuration by forming on the mandrel a first layer of glass fiber reinforced resin, wrapping on the first layer a plurality of adjacent rib forms defining therebetween radially extending grooves, filling the grooves with essentially the same kind of resin as that of the first layer plus a filler material, superimposing on the rib forms and the materials filling the grooves a second layer of glass fiber reinforced resin, and then commonly curing the resin of the composite comprising the two layers and the resin-filler material in the grooves.

AS SHOWN ON THE DRAWINGS

Figure 1:
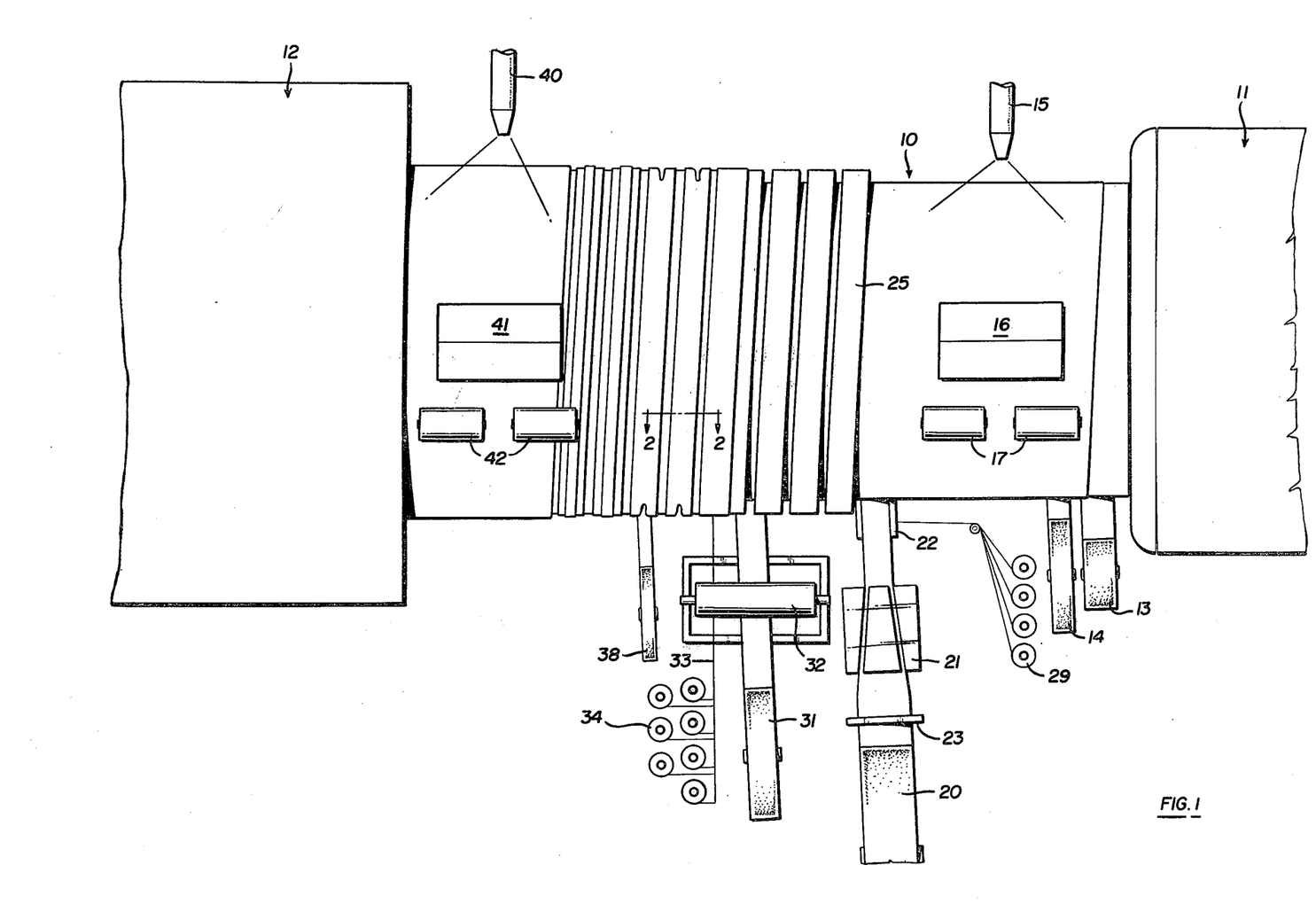
FIG. 1 is a schematic view showing in plan an apparatus of the present invention capable of carrying out a method of the present invention to produce the composite structural wall of the present invention.
Figure 3:
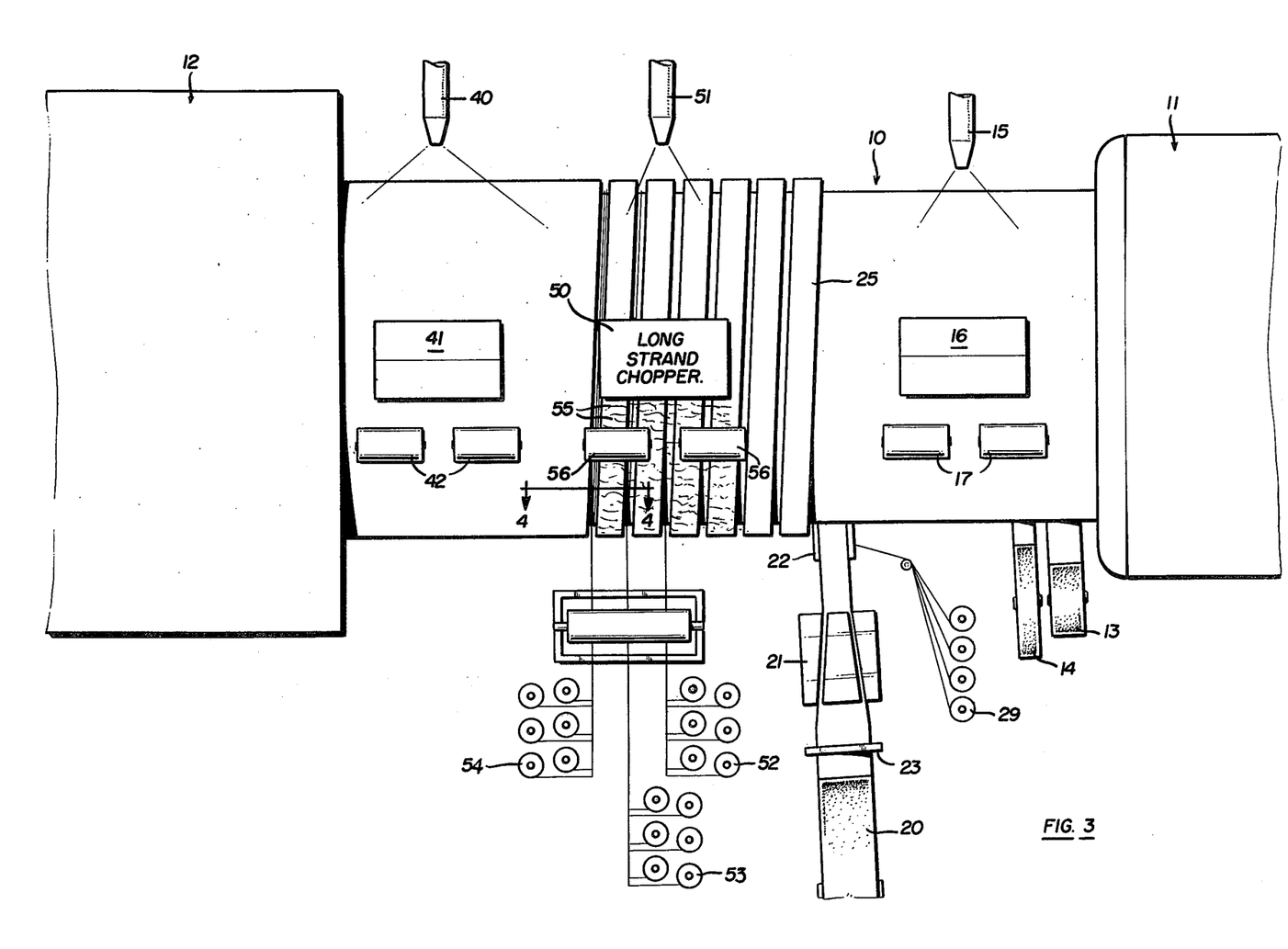
FIG. 3 is a view similar to FIG. 1 illustrating a different form of apparatus capable of carrying out a modified method of the present invention.
Figure 5:
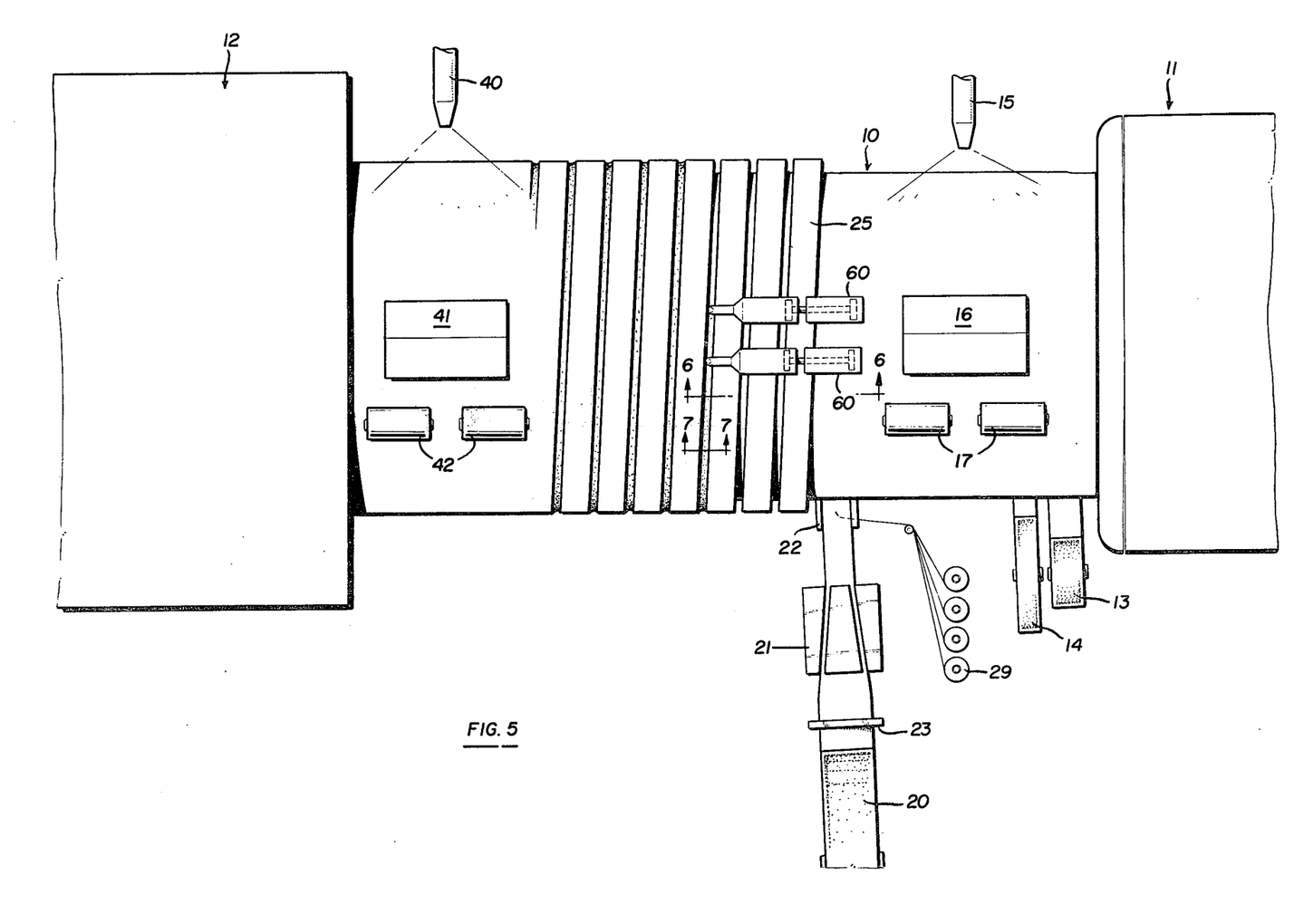
FIG. 5 is a view similar to FIGS. 1 and 3 illustrating still another apparatus of the present invention capable of carrying out another modified method of the present invention to make a composite structural wall of the present invention.

In each of FIGS. 1, 3 and 5, reference numeral 10 refers generally to a mandrel of the type illustrated in Poulsen U.S. Pat. No. 3,464,879. In this apparatus, which is well known in the art, an endless steel band is trained helically over a guiding apparatus with adjacent edge portions of the successive wraps of the band being in edge-to-edge contact to define a continuous cylindrical mandrel surface which travels helically along the axial extent of the guide mechanism. The band is driven by suitable means housed in a housing 11 to be exposed for the purpose of building up a composite structural wall of the present invention. After the composite wall structure has been built up, the composite wall is cured in a curing oven indicated schematically at 12. The band constituting the mandrel surface thus moves helically from the motor house 11 to the curing oven 12.

Figure 2:
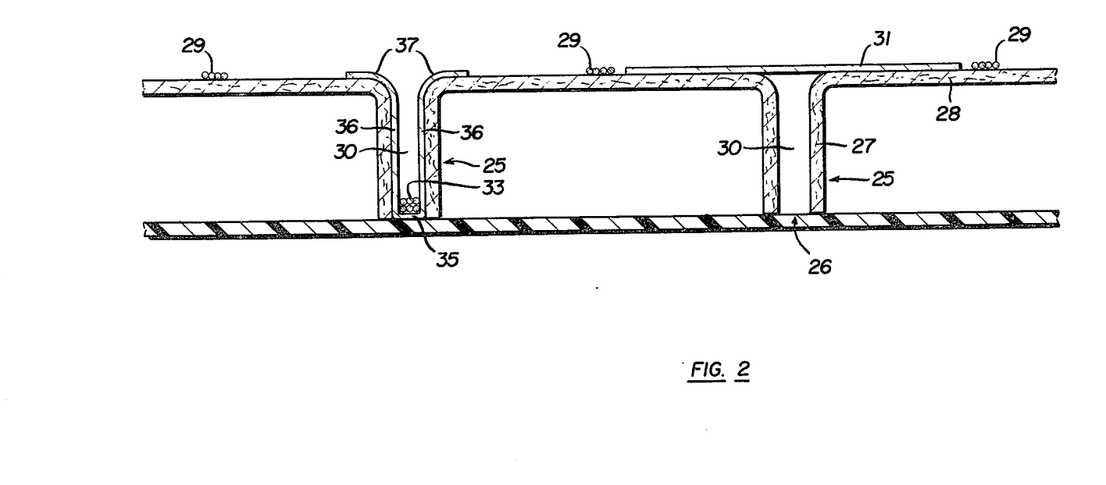
FIG. 2 is a broken sectional view taken along the plane 2—2 of FIG. 1 and showing the present invention made by the method and apparatus of FIG. 1.
Figure 4:
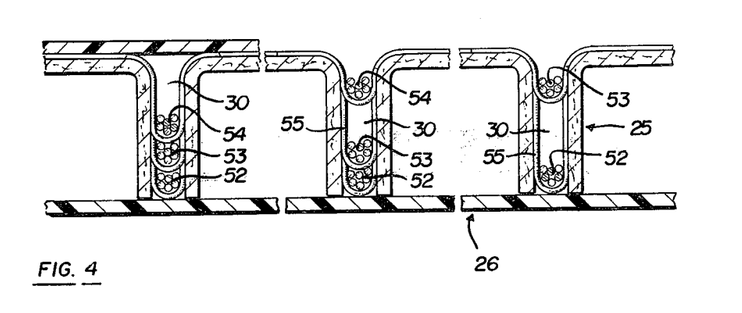
FIG. 4 is a sectional view similar to FIG. 2 but taken along the plane 4—4 of FIG. 3 illustrating a composite structural wall of the present invention made by the apparatus and method of FIG. 3.
Figures 6, 7:
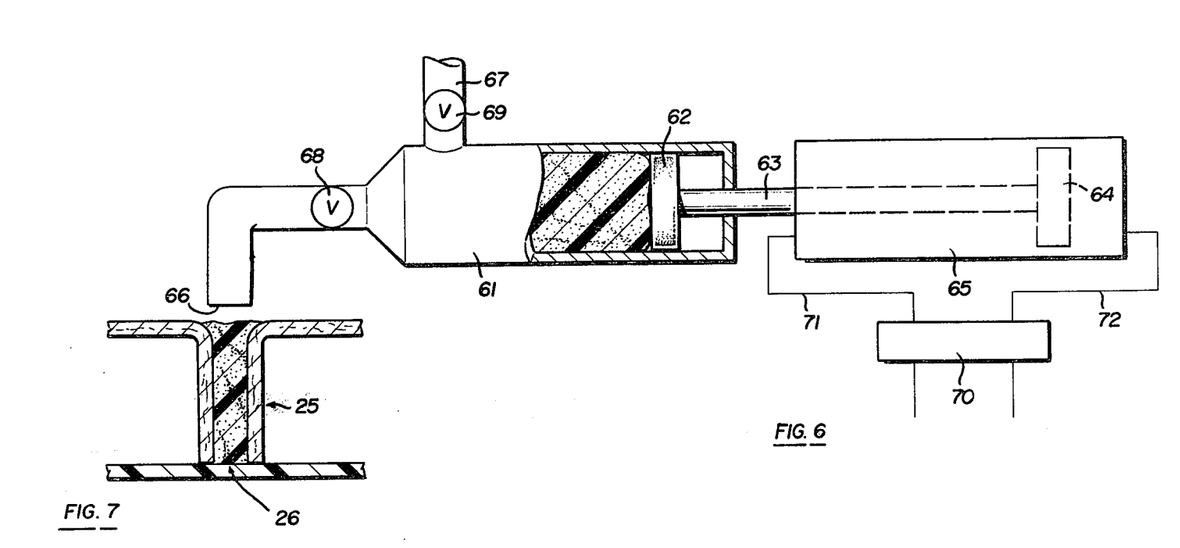
FIG. 6 is an enlarged fragmentary sectional view illustrating a portion of the apparatus in FIG. 5.
FIG. 7 is a view similar to FIGS. 2 and 4 but taken along the plane 7—7 of FIG. 5 illustrating a composite structural wall of the present invention manufactured on the apparatus of FIGS. 5 and 6.

In the course of building up the composite wall structure of the present invention, the various components of the structure are applied to the band, and the bands of the various embodiments of FIGS. 1 and 2, of FIGS. 3 and 4, and of FIGS. 5, 6 and 7 are generally the same.

Of course, the movable band-type mandrel shown in the drawings can be replaced by an axially fixed, rotatable cylindrical mandrel, if desired.

THE EMBODIMENT OF FIGS. 1 and 2

In this embodiment of the invention, a plastic surface film, such as Mylar or the like, is initially applied to the mandrel band to seal the joints between adjacent edges of the band as it travels over the band support mechanism, this plastic film being applied from a fixed station 13 located adjacent the motor house 11. Next, a surfacing mat or the like, preferably an open-weave glass fiber woven mat is applied from a station 14 directly over the plastic film. A resin from a station 15 is applied over the plastic film and the surfacing mat on the surface of the mandrel band. This resin preferably is a thermosetting polyester resin having incorporated therein the necessary accelerators and curing agents. Overlying the mandrel 10 and generally in alignment with the station 15 is a glass fiber chopping apparatus 16. Glass fiber roving is fed into the chopper to be chopped into discrete lengths, on the order of 1 to 5 inches, and this glass fiber is sprinkled onto the resin-wet surfacing mat applied from the station 14. A pair of rollers 17 contact the surface of the chopped fibers applied to the resin from the station 15 to build up a first layer of glass fiber reinforced resin forming the inner skin or shell of the composite structure, the rollers 17 insuring the wetting out of the chopped glass fiber with the resin.

Next, a rib form, indicated generally at 25, is applied to the first shell built up at stations 14–17. The rib form 25 preferably comprises corrugated cardboard from a supply roll 20 passing over a shaper 21 which shapes the cardboard into an inverted U-shape. As illustrated, the U-shaped cardboard rib form 25 is applied to the underside of the mandrel by passing it over a guide 22 located adjacent the surface of the mandrel. To permit the U-shaped cardboard to wrap around the cylindrical mandrel, the cardboard is slit in the region of its vertical legs by means of a slitting apparatus, indicated schematically at 23. Of course, a pre-fabricated plastic or metal rib form of the same general shape may be used.

The U-shaped rib form 25 thus is applied to the mandrel so that the inner extremities of the two legs of the U contact the initial shell built up by the apparatus 15–17 with the bight of the U being spaced from the layer formed by the inner shell. The width of the rib form, i.e. the extent thereof axially of the mandrel, is slightly less than the width of the mandrel band, and the rib form 25 is thus applied helically to the inner wall, with adjacent convolutions of the rib form 25 being spaced to define a helical groove therebetween. Turning now to FIG. 2 of the drawings, the initial inner wall built up of chopped glass fiber strands and resin at stations 15–17, is indicated generally be reference numeral 26 and the cardboard rib from is indicated generally at 25. The rib form 25 includes radial legs 27, the inner extremities of which contact the surface of the initial layer 26, and a outer bight portion 28 spaced from the inner wall 26. Defined intermediate adjacent convolutions of the rib form is a helical groove 30. The axial extent of a section through a convolution of the cardboard rib form 25 equals the width of the steel mandrel band minus the width of the groove 30. Typically, the steel mandrel band width is 5¼ inches, the axial dimension of the groove 30 is one-fourth inch, and the width of a section through a convolution of the cardboard form is five inches.

Returning now to FIG. 1, it will be seen that the cardboard rib form 25 is retained on the surface layer 26 by means of support rovings of filament wound glass fibers applied from station 29, these strands being tensioned to retain the cardboard rib form in the position indicated in FIG. 2.

Next, a layer of fiber glass fabric 31 is applied to the rib form 25. The fabric 31 is specifically applied to cover the helical groove 30 and portions of adjacent convolutions of the rib form 25 on opposite sides thereof, as illustrated in FIG. 2 of the drawings. The fiber glass fabric 31 may be a woven fabric or a non-woven mat, and is impregnated with the same kind of resin as is applied at station 15 by passing it through an impregnation bath 32. Since the helical groove 30 has the same helix angle as the mandrel band, the fabric 31 is applied at the same helix angle to bridge adjacent convolutions of the rib form 25.

Next, filament wound glass fiber rovings 33 are applied from the station 34 at the same helical angle, the rovings being located in registry with the helical groove 30 and overlying the fabric layer 31 superimposed on the groove 30. The roving strands 33 are applied under tension and are pulled by such tension downwardly into the groove 30. The rovings 33 also traverse the impregnation bath 32 for impregnation with the same resin.

As illustrated in FIG. 2, the rovings 33 under tension pull the fabric 31 downwardly into the groove 30 to the configuration illustrated in FIG. 2. By virtue of the displacement of the rovings 33 and the fabric 31 into the groove, the radial legs 27 of the rib form 25 are covered by the fabric 31, and a rib having the configuration shown in FIG. 2 results.

This specific rib construction comprises the fabric 31 defining an inner bight portion 35 confined by the rovings 33 against the exterior surface of the inner layer 26, a pair of parallel, radial legs 36 extending respectively alongside the rib form legs 27, and outer extremities 37 respectively overlying adjacent convolutions of the bight or outer wall surface 28 of the rib form 25.

Next, the groove 30 can be covered by a suitable tape material, preferably formed of fiber glass or the like, indicated at 38, and helically wound over the terminal legs 37 of the rib structure. Finally, an outer skin or layer is applied, utilizing the same technique in building up essentially the same kind of outer wall structure as the inner wall 26; namely, the same kind of resin applied from a resin application station indicated schematically at 40, and chopped glass roving applied from a chopping station 41, wetting of the chopped fiber with the resin being insured by a roller station 42.

To cure the final composite structure, the mandrel passes through the curing oven 12. Following curing, the composite wall is removed from the mandrel.

THE EMBODIMENT OF FIGS. 3 and 4

In the embodiment of FIGS. 3 and 4, essentially the same apparatus is utilized as illustrated in FIG. 1 of the drawings. The inner layer 26 is built up as earlier described and the rib form 25 is applied as earlier described to provide the helical groove 30 between convolutions of the rib form.

Rather than applying the fabric 31, long strand chopped glass fibers are applied from a chopping station 50 located intermediate the chopper 16 and the chopper 41 for the inner and outer layers, respectively. The chopping station 50 is effective to form strands of a length sufficient to straddle the groove 30 between adjacent convolutions of the rib form 25, and to orient the strands so that they are primarily oriented axially of the mandrel 10. A resin applicator station 51 is provided to wet out the strands 55 from the chopping station 50, and a rolling station 56 may be added if desired to further wet out the long strands.

After the strands have been applied to the outer surface of the rib form 25, at least some of the strands straddle the groove 30 between adjacent convolutions of the rib form. Next filament wound roving are applied from the successive filament winding stations 52, 53 and 54. These filament windings are aligned with respective convolutions of the groove 30 as heretofore described and are wound into the groove, carrying into the groove the long strands 55 from the chopping station 50 in much the same manner as heretofore described in connection with the fabric 31.

Essentially the same rib structure is obtained as was described in connection with FIG. 2, this rib structure being illustrated in FIG. 4 of the drawings.

The individual long chopped strands from the chopper 50 are deflected into U-shapes by the tensioned filament would rovings from stations 52–54. The individual strands, in effect, are formed into a mat by the filament windings, in which mat the individual strands are primarily oriented radially. The same effect can be obtained by utilizing a non-woven tape comprising longitudinal tacking strands supporting a plurality of transverse filament bundles, as disclosed in Grosh U.S. Pat. No. 3,676,246. The tacking strands are filament wound into the groove 30 with transverse filament bundles being pulled medially into the groove while overlapping the adjacent convolutions of the rib form 25.

An outer layer of glass fiber reinforced resin is applied from the chopping station 41 and the resin applicator 40 as heretofore described and the final composite structure of FIG. 4 is built up. The essential difference between the structure of FIG. 2 and the structure of FIG. 4 is that the individual chopped strands of FIG. 4, when finally cured, form ribs in which the individual fibers are radially oriented to provide a radial rib of enhanced structural strength.

THE EMBODIMENT OF FIGS. 5–7

In that embodiment of the invention illustrated in FIG. 5 of the drawings, the inner layer 26 is built up as earlier described and the rib form 25 is applied to provide the helical groove 30 also as earlier described.

The groove 30 is filled with a resin-filler mixture from a pair of alternately actuated dispensing mechanisms 60 illustrated in FIG. 5 and FIG. 6. More specifically, the dispensing mechanism includes a cylindrical dispenser housing 61 having disposed therein a dispensing piston 62 connected by a piston rod 63 to an actuating piston 64 located in an actuating cylinder 65. The dispensing cylinder 61 communicates through a goose neck having a depending tubular restricted dispensing nozzle 66 positioned to directly overlie the groove 30. The dispensing cylinder 61 also communicates with a supply line 67. Separate, alternately operated, open-shut valves 68 and 69 control the dispensing of the contents of the cylinder 61 through the nozzle 66. Dispensing occurs when the valve 68 is open and the valve 69 is closed. The cylinder 61 is refilled from the supply line 67 when the valve 69 is open and the valve 68 is closed. The cylinder 65 is hydraulically actuated by means of a hydraulic valve 70 connected to a source of hydraulic fluid under pressure and connected through supply lines 71 and 72 to the cylinder 65.

When the interior of the dispensing cylinder 61 in advance of the piston 62 is filled with material to be dispensed and the cylinder 65 is actuated by fluid under pressure through the line 72, the pistons 64 and 62 advance to dispense material through the nozzle 66 into the groove 30. When the material in the cylinder 61 is exhausted, valve 68 is closed, the valve 69 is opened and the hydraulic fluid under pressure is introduced by the valve 70 through the line 71 to the front end of the cylinder 65. This retracts the piston 62 to refill the cylinder 61 from the supply line 67. The use of the pair of mechanisms 60 insures continuous filling of the groove 30 from one or the other of the dispensers.

Preferably the material filling the dispensing cylinder 61 and dispensed thereby into the groove 30 is a mixture of resin and filler. Typically, this mixture will be the same kind of resin as applied at the stations 15 and 40, plus sand and chopped glass fiber. The structure obtained by utilization of the apparatus of FIGS. 5 and 6 is illustrated in FIG. 7 of the drawings, wherein it will be seen that the groove filled with sand-filled or sand and glass fiber-filled polyester material forms a rib interposed between adjacent convolutions of the rib form 25 and overlaid by the outer shell built up at stations 40, 41 and 42. Of course, other filler materials can be utilized to build up the rib. For example, glass flakes, silica flour, metal or plastic fibers or the like can be used.

In the preferred embodiments of the invention shown, the rib form 25, the groove 30, and the rib formed in the groove 30 are each in the form of a single helix. It is contemplated to be within the scope of the invention, however, to provide a plurality of separate, annular, axially spaced rib forms 25 defining a plurality of separate, annular, axially spaced grooves 30 and to form a plurality of separate, annular, axially spaced ribs in the grooves 30. Accordingly, as used in the claims, the word "ribs" is intended to cover separate annular ribs as well as separate convolutions of a helical rib, the term "rib forms" is intended to cover separate annular rib forms as well as separate convolutions of a helical rib form, and the word "grooves" is intended to cover separate annular grooves as well as separate convolutions of a helical groove.

I claim:

1. In a composite wall structure for fluid retention, the wall structure having spaced, concentric tubular inner and outer shells each formed of glass fiber reinforced resinous polymeric material, the improvement of an intermediate spacing structure interposed between said shells and comprising:
    1. generally U-shaped rib forms spaced from each other axially of the shells and each having a bight portion adjacent the outer shell and a pair of spaced, generally parallel leg portions extending from the bight portion toward the inner shell, and
    2. ribs interspersed with said rib forms and integrally joining said shells to each other, said ribs each comprising a glass fiber mat covering leg portions of adjacent rib forms, filament-wound glass rovings retaining a mat portion bridging adjacent rib forms against the inner shell, and resinous polymeric material impregnating both the mat and said rovings.

2. In a composite wall structure having spaced concentric tubular inner and outer shells each formed of glass fiber reinforced resinous polymeric material, the improvement of an intermediate spacing structure interposed between said shells and comprising:
    1. generally U-shaped rib forms spaced from each other axially of the shells and each having a bight portion adjacent the outer shell and a pair of spaced, generally parallel leg portions extending from the bight portion toward the inner shell, and
    2. ribs interspersed with said rib forms and integrally joining said shells to each other, said ribs comprising the same kind of resinous polymeric material as is in said shells and a filler material, the resinous polymeric material of said shells and of said ribs being commonly cured to form an integral monolithic structure, and said rib forms functioning solely as spacers without otherwise materially contributing to the strength or rigidity of said composite wall structure.

3. The structure of claim 2, wherein the filler material of said ribs comprises chopped glass fiber strands.

4. The structure of claim 2, wherein the filler material of said ribs comprises particulate material plus chopped glass fiber strands.

5. The structure of claim 2, wherein the filler material of said ribs comprises sand.

6. The structure of claim 2, wherein the filler material of said ribs comprises a woven glass fiber fabric.

7. The structure of claim 2, wherein the filler material of said ribs comprises glass flakes.

8. The structure of claim 2, wherein the filler material of said ribs comprises a non-woven mat of glass fibers.

9. The structure of claim 2, wherein the ribs are helical and continuous.

10. The structure of claim 2, wherein the ribs are annular and independent.

11. In a composite wall structure for underground fluid retention, the wall structure having spaced concentric tubular inner and outer shells each formed of glass fiber reinforced resinous polymeric material, the improvement of an intermediate spacing structure interposed between said shells and comprising:
   1. generally U-shaped rib forms spaced from each other axially of the shells and each having a bight portion adjacent the outer shell and a pair of spaced, generally parallel leg portions extending from the bight portion toward the inner shell, and
   2. ribs interspersed with said rib forms and integrally joining said shells to each other, said ribs each comprising the same kind of resinous polymeric material as is in said shells, a particulate filler, and glass fibers, and the resinous polymeric material of said shells and of said ribs being commonly cured into an integral monolithic structure in which said ribs serve as integral, radial webs spacing the shells from each other.

12. A composite laminated cylindrical liquid-retaining wall comprising an inner cylindrical lamina of glass fiber reinforced resinous polymeric material, a plurality of generally U-shaped rib forms encircling said inner lamina and each having a bight portion spaced from said inner lamina and a pair of spaced, generally parallel leg portions extending from the bight portion toward said inner lamina, said rib forms being spaced from each other axially of said inner lamina to define substantially radial grooves therebetween, glass fibers impregnated with resinous polymeric material disposed in said grooves and predominately oriented so that their lengths project radially of said inner lamina, a plurality of continuous filament wound glass fibers impregnated with resinous polymeric material disposed in said grooves immediately adjacent said inner lamina, the filament wound fibers being tensioned to retain the oriented fibers in said grooves by entrapping the oriented fibers against said inner lamina, and an outer cylindrical lamina of glass fiber reinforced resinous polymeric material encasing said rib forms and the fibers in said grooves, the resinous polymeric material of said inner and outer laminae and the resinous polymeric material impregnating said fibers being commonly cured to form a monolithic structure wherein the resinous polymeric material and the fibers in said grooves form integral ribs interconnecting said laminae.

* * * * *